United States Patent Office 3,576,910
Patented Apr. 27, 1971

3,576,910
A-B-S POLYBLEND
Michael B. Jastrzebski, Ware, Mass., assignor to
Monsanto Company, St. Louis, Mo.
No Drawing. Filed Oct. 23, 1967, Ser. No. 681,953
Int. Cl. C08f 41/12
U.S. Cl. 260—876
22 Claims

ABSTRACT OF THE DISCLOSURE

There is disclosed a polyblend composition having a matrix of an interpolymer of monovinylidene aromatic hydrocarbon and an unsaturated nitrile, and first and second graft copolymers each having a rubber substrate and a superstrate of an interpolymer of a monovinylidene aromatic hydrocarbon and an unsaturated nitrile. The first and second graft copolymers are relatively highly cross-linked and relatively lowly cross-linked, respectively. The combined graft copolymers comprise 1.0 to 70.0 percent by weight of the polyblend, and the first graft copolymer comprises about 60.0 to 95.0 percent by weight of the combined graft copolymers.

A process for making such polyblends is disclosed wherein the two graft copolymers are prepared separately and thereafter blended although both may be prepared in a single reactor from suitable controlled rubber feedstocks. Other components may optionally be included.

BACKGROUND OF THE INVENTION

As is well known, polyblends of rubbers with styrene/acrylonitrile type interpolymers have advantages in providing compositions of desirable properties including toughness and chemical resistance, as well as providing good formability. Generally, increasing the rubber content is advantageous in increasing the toughness, but some reduction in other properties such as gloss is generally experienced with increase in rubber content.

It is an object of the present invention to provide a novel polyblend of rubber with an interpolymer consisting at least principally of a monovinylidene aromatic hydrocarbon and an unsaturated nitrile which exhibits a highly desirable balance of properties.

It is also an object to provide such a polyblend which is relatively easily and economically formulated and which affords the opportunity for facile tailoring of properties from standard, readily stocked components.

Another object is to provide such a polyblend which has high impact resistance, good gloss and good tensile properties and which affords a high degree of versatility.

Another object is to provide a facile and relatively economical process for preparing such rubber-interpolymer polyblends which permits utilization of existing equipment and techniques for preparation of the grafted rubber components thereof.

SUMMARY OF THE INVENTION

It has now been found that the foregoing and related objects and advantages may be readily attained in a composition comprising a polyblend of (A) a matrix of an interpolymer consisting at least principally of a monovinylidene aromatic hydrocarbon and an unsaturated nitrile; (B) a first graft copolymer having a rubber substrate and a superstrate of an interpolymer consisting at least principally of a monovinylidene aromatic hydrocarbon and an unsaturated nitrile; and (C) a second graft copolymer having a rubber substrate and a superstrate of an interpolymer consisting at least principally of a monovinylidene aromatic hydrocarbon and an unsaturated nitrile. One of the graft copolymers is relatively highly cross-linked, i.e., it has a swelling index of less than 15. The other graft copolymer is relatively lowly cross-linked, i.e., it has a swelling index of not less than 20. The two graft copolymers combined comprise 1.0 to 70.0 percent by weight of the total blend and the highly cross-linked copolymer comprises about 60.0 to 95.0 percent of the total weight of the graft copolymers combined.

The swelling index is determined in benzene by (a) maintaining a mixture of 0.3 grams of the rubber and 75 milliliters of benzene in total darkness for twenty-four hours at 20° centigrade, (b) filtering the mixture through a 100 mesh stainless steel screen, (c) washing the benzene-insoluble portion of the rubber with 10 milliliters of benzene and determining the weight of the insoluble, solvent-swollen polymer, (d) evaporating an aliquot of the filtrate to dryness to determine the weight of the benzene-soluble portion of the rubber, and (e) calculating the swelling index (i.e., the ratio of solvent-swollen gel to dry gel) in accordance with the equation:

$$\text{Swelling Index} = \frac{\text{Wt. in grams of benzene-swollen polymer}}{0.3 - \text{wt. in grams of benzene-soluble polymer}}$$

The theory of operation is not fully understood, but it is believed that the lowly cross-linked particles have a tendency to cluster and simulate relatively large particles which provide a high degree of toughness and are then extended by the highly cross-linked rubber particles which do not exhibit this tendency. By proper combination, the two graft components cooperate in a manner such that the gloss and tensile properties of the composition are maintained at desirable levels.

THE INTERPOLYMER

The interpolymers of the present invention of both the matrix and the graft superstrates consist at least principally of a monovinylidene aromatic hydrocarbon and an unsaturated nitrile, i.e., such monomers comprise at least 50.0 percent by weight and preferably at least 75.0 percent by weight of the interpolymers. Most desirably, such monomers comprise at least 90.0 percent by weight of the interpolymer, and the usual commercial compositions are substantially completely comprised of such monomers although minor amounts, i.e., less than 5.0 percent by weight of other components such as chain transfer agents, modifiers, etc., may be included.

As will be readily appreciated, the interpolymers used for the graft superstrates should be compatible with the interpolymer of the matrix so as to obtain good properties which will require the presence of the similar monomers. Most desirably, the superstrate interpolymers closely approximate the chemical composition of the interpolymer of the matrix so as to obtain matching of the chemical properties, and, accordingly, it is desirable that the superstrates of both graft copolymers closely approximate each other. In addition, it is believed that increased chemical bonding is thereby obtained with commensurate improvement in chemical properties. Moreover, by close matching of certain interpolymers used in the matrix and superstrate such as those containing acrylate, it is possible to obtain a high degree of translucency and substantial transparency. However, it will be appreciated that deviations in the composition of the interpolymers of the matrix and superstrates such as different monomers and/or ratios may be desirable for some applications and that some deviations may inherently occur as the result of process variables.

Exemplary of the monovinylidene aromatic hydrocarbons which may be used in the interpolymers are styrene;

alpha-alkyl monovinylidene monoaromatic compounds, e.g. alpha-methylstyrene, alpha-ethylstyrene, alpha-methylvinyltoluene, alpha-methyl dialkyl-styrenes, etc.; ring-substituted alkyl styrenes, e.g. vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl, ring-halo-substituted styrenes, e.g. 2-chloro-4-methylstyrene, 2,6-dichloro-4-methylstyrene, etc.; vinyl naphthalene; vinyl anthracene, etc. The alkyl substituents generally have 1 to 4 carbon atoms and may include isopropyl and isobutyl groups. If so desired, mixtures of such monovinylidene aromatic monomers may be employed.

Exemplary of the unsaturated nitriles which may be used in the interpolymers are acrylonitrile, methacrylonitrile, ethacrylonitrile, and mixtures thereof.

Exemplary of the monomers which may be interpolymerized with the monovinylidene aromatic hydrocarbons and unsaturated nitriles are conjugated 1,3 dienes, e.g. butadiene, isoprene, etc.; alpha- or beta-unsaturated monobasic acids and derivatives thereof, e.g. acrylic acid, methyl acrylate, ethyl acrylate, butyl acrylate, 2-ethylhexyl acrylate, methacrylic acid and the corresponding esters thereof, acrylamide, methacrylamide; vinyl halides such as vinyl chloride, vinyl bromide, etc.; vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc. As is known in the art, the amount of these comonomers which may be included in the interpolymer will vary as the result of various factors.

In addition, the monomer formulation at the time of polymerization may include a preformed polymer or a partially polymerized material such as a partially polymerized monovinylidene aromatic hydrocarbon or interpolymer thereof.

The polymerizable monomer mixtures contain at least 20 percent by weight of the monovinylidene aromatic monomer and preferably at least 50 percent by weight thereof. They also contain at least 5 percent by weight of the unsaturated nitrile and preferably at least 10 percent by weight thereof. From the standpoint of highly advantageous commercial practice, the monomer formulations contain 20 to 95 percent, and preferably 60 to 85 percent, by weight of the vinylidene aromatic hydrocarbon and 80 to 5 percent, and preferably 40 to 15 percent, by weight of the unsaturated nitrile.

The matrix

As is well known in the art, the polyblend is produced is produced by polymerizing the monomers in the presence of the preformed rubber. It is believed that a portion of the polymer formed grafts onto the preformed rubber since it is generally not possible to extract the rubber from the polymerized mass with the usual rubber solvents although some of the rubber polymer may not be in actual chemical combination with the polymer.

Since 100 percent grafting efficiency is not usually attainable, at least a portion of the monomers polymerized in the presence of the preformed rubber will not chemically combine therewith so as to provide a matrix for the graft copolymers. This portion may be increased or decreased depending upon the ratio of monomers to rubber, the particular monomer formulation, the nature of the rubber, and the conditions of polymerization. Generally, interpolymers prepared without the inclusion of rubber will be compounded with material from the graft polymerization reactions to obtain the desired composition.

Any of the usual polymerization processes may be used to effect polymerization of the matrix, i.e., mass, suspension and emulsion, or combinations thereof. Such techniques are well known and are also described herein with respect to the graft polymerization reactions.

The rubber substrate

Various cross-linkable rubbers onto which the interpolymer may be grafted during the polymerization in the presence thereof are utilizable as the substrate of the graft copolymer including diene rubbers, acrylate rubbers, polyisoprene rubbers, and mixtures thereof.

The preferred rubbers are diene rubbers or mixtures of diene rubbers, i.e., any rubbery polymers (a polymer having a second order transition temperature not higher than 0° centigrade, preferably not higher than −20° centigrade, as determined by ASTM Test D–746–52T) of one or more conjugated 1,3 dienes, e.g., butadiene, isoprene, piperylene, chloroprene, etc. Such rubbers include homopolymers and interpolymers of conjugated 1,3-dienes up to an equal amount by weight of one or more copolymerizable monoethylenically unsaturated monomers, such as monovinylidene aromatic hydrocarbons (e.g., styrene; an aralkylstyrene, such as the o-, m-, and p-methylstyrenes, 2,4-dimethylstyrene, the ar-ethylstyrenes, p-tert-butylstyrene, etc.; an alpha-alkylstyrene, such as alpha-methylstyrene, alpha-ethylstyrene, alpha-methylstyrene, etc.; vinyl naphthalene, etc.); ar-halo monovinylidene aromatic hydrocarbons (e.g., the o-, m-, and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); alpha-olefins (e.g., ethylene, propylene, etc.); pyridines; vinyl esters (e.g., vinyl acetate, vinyl sterate, etc.); vinyl and vinylidene halides (e.g., the vinyl and vinylidene chlorides and bromides, etc.); and the like. The rubber utilized to prepare the lowly cross-linked graft copolymer should have a gel content of not more than 70 percent and preferably less than 60 percent. Since some cross-linking is desirable even in the lowly cross-linked polymer, the rubber desirably has a gel content of at least 30 percent.

The cross-linking of the rubber may be accomplished by including up to about 2.0 percent by weight of a cross-linking agent during polymerization of the rubber monomers. Alternatively, cross-linking may be effected subsequent to preparation of the rubbery substrate by heating, addition of peroxides or other cross-linking agents or irradiation. Suitable cross-linking agents for incorporation with the rubber monomers are exemplified by divinylbenzene, diallyl maleate, diallyl fumarate, diallyl adipate, allyl acrylate, allyl methacrylate, diacrylates and dimethacrylates of polyhydric alcohols, e.g., ethylene glycol dimethacrylate, etc. Although cross-linking of the highly cross-linked graft copolymer may be effected subsequent to graft polymerization or as an incident thereto, it is generally desirable to effect the cross-linking prior to graft polymerization for optimum control.

Accordingly, when the preferred graft polymerization procedure is employed, the rubber substrate for the highly cross-linked graft copolymer has a gel content of at least 90 percent and preferably over 95 percent. Normally the highly cross-linked rubber substrate will have a swelling index of less than 15 and preferably less than 10.

The gel content is determined in benzene by (a) maintaining a mixture of 0.3 gram of the rubber and 75 milliliters of benzene in total darkness for 24 hours at 20° centigrade, (b) filtering the measure through a Celite (infusorial earth) pack, (c) heating 25 milliliters of the filtrate overnight in a sand bath at 75° centigrade and then in an oven at 100° centigrade for one-half hour to evaporate the benzene, and (e) calculating the gel content in accordance with the equation:

$$\text{Gel content} = \frac{100 = \text{Weight in grams}}{\text{Weight in grams}}$$

As previously indicated, some degree of cross-linking will inherently occur during the graft polymerization reaction. Thus, it is important to control not only the rubber substrate but also the conditions of graft polymerization by controlling the superstrate constituents to avoid excessive cross-linking of the lowly cross-linked graft copolymer. In contrast, the graft polymerization reaction may be utilized to facilitate the development of the highly cross-linked graft copolymer by selection of peroxides or other cross linking agents, temperatures, etc. Obviously, the nature of the rubber substrate will vary with the graft polymer process to be employed and the need for solubility or dispersability of the rubber.

Thus, various techniques may be utilized for polymerizing the rubber monomers including mass, suspension, and emulsion. From the standpoint of the preferred emulsion graft polymerization processes, emulsion polymerization of the rubbers will produce a latex which is useful as the base for emulsion polymerization of the graft copolymer. However, rubbers prepared by other techniques may be employed in the emulsion graft polymerization process so long as homogeneous distribution can be effected in the reaction medium. Obviously, highly cross-linked rubber substrate will be difficult to dissolve in the monomer formulation so that highly cross-linked rubber substrates are not advantageously employed in mass polymerization techniques.

The preparation of the lowly cross-linked rubber substrates is desirably effected by avoiding the presence of any cross-linking agents and excessive amounts of peroxide catalysts. Desirably the polymerization of the rubber monomers is terminated prior to complete conversion and antioxidants may provide some advantage in retarding excessive cross-linking.

A preferred group of rubbers are those consisting essentially of 75 to 100 percent by weight of butadiene and/or isoprene and up to 25 percent by weight of a monomer selected from the group consisting of monovinylidene aromatic hydrocarbons (e.g., styrene), unsaturated nitriles (e.g., acrylonitrile), acrylates (e.g., methyl methacrylate), or mixtures thereof. Particularly advantageous substrates are butadiene homopolymer or an interpolymer of 90 to 95 percent by weight butadiene and 5 to 10 percent by weight of acrylonitrile or styrene.

Graft polymerization processes

The graft copolymers are prepared by polymerizing monomers of the interpolymer in the presence of the preformed rubber substrate, generally in accordance with conventional graft polymerization techniques involving suspension, emulsion or mass polymerization, or combinations thereof. In such graft polymerization reactions, the preformed rubber substrate generally is dissolved in the monomers and this admixture is polymerized to combine chemically or graft at least a portion of the interpolymer upon the rubber substrate. Depending upon the ratio of monomers to rubber substrate and polymerization conditions, it is possible to produce both the desired degree of grafting of the interpolymer onto the rubber substrate and the polymerization of ungrafted interpolymer to provide a portion of the matrix at the same time.

Although the amount of interpolymer superstrate grafted onto the rubber substrate may vary from as little as 10 parts by weight per 100 parts of substrate to as much as 200 parts per 100 parts, and even higher, the highly cross-linked graft copolymers have a superstrate/substrate ratio of about 30–200:100 and most desirably about 60–150:100. The lowly cross-linked graft copolymers have a superstrate/substrate ratio of 10–50:100, and most desirably about 15–40:100.

To minimze requirements for separate equipment, the same process of polymerization desirably may be utilized to prepare both types of rubber graft components, as well as ungrafted interpolymer or crystal for use as the matrix when required. However, if so desired, different polymerization techniques may be utilized to produce the two graft copolymers thus allowing additional variations in the graft copolymers. Generally, the cross-linking of the graft copolymer will be varied by varying the rubber substrate employed as previously indicated. For example, a rubber latex which will usually have a relatively small particle size, i.e., less than about 0.2 micron, may be creamed through the use of polyvalent metal salts to obtain agglomeration of a number of the small rubber particles into a larger mass. During the grafting reaction, the polymerizing monomers will graft onto this agglomerate and thus provide a graft copolymer of larger size. In addition, seeding techniques during polymerization of the rubber and/or during the polymerization of the graft copolymer may be utilized to vary the size of the particles thus produced.

In the preferred emulsion polymerization processes, the monomers and rubber substrate are emulsified in water by use of suitable emulsifying agents such as fatty acid soaps, alkali metal or ammonium soaps of high molecular weight alkyl or alkaryl sulfates and sulfonates, mineral acid salts of long chain aliphatic amines, etc. Emulsifying agents which have proven particularly advantageous are sodium oleate, sodium palmitate, sodium stearate and other sodium soaps. Generally, the emulsifying agent is provided in amounts of about 1 to 15 parts by weight per 100 parts by weight of the monomers, and water is provided in an amount of about 1 to 4 parts per part of monomers, and even in larger ratios where greater dilution is desirable.

If so desired, an aqueous latex formed in emulsion polymerization of the rubber substrate may provide the aqueous medium into which the monomers are incorporated with or without additional emulsifying agents, etc. However, the rubber may be dissolved in the monomers and the mixture emulsified, or a latex thereof may be separately prepared.

Various water-soluble free radical polymerization initiators are conventionally used for emulsion polymerization of the rubber monomer including conventional peroxy and perazo catalysts and the resultant latex may be used as the aqueous medium with which the interpolymer monomers are admixed. In this manner, the catalyst for the rubber polymerization may function in whole or in part as the catalyst for the graft polymerization. However, additional catalyst may be added at the time of graft polymerization. Exemplary of suitable peroxy catalysts are the alkali metal peroxides, persulfates, perborates, peracetates, and percarbonates, and hydrogen peroxide. If so desired, the catalysts may be activated to form redox systems. For mass polymerization processes, oil-soluble catalysts are employed. However, in addition to such chemical compounds, other techniques for generating free-radicals may be employed such as actinic radiation.

Chain transfer agents and other polymerization modifiers may desirably be included and it is generally advantageous to incorporate a higher alkyl mercaptan, such as tert-dodecyl mercaptan, which acts both as a promoter and a regulator. In addition, antioxidants and stabilizers such as the alkylated phenols may be added.

The emulsion mixture is then polymerized in an inert atmosphere at temperatures in the range of 20 to 100° centigrade with agitation. Pressures of 1 to 100 pounds per square inch may be employed, and the monomers and/or additional catalyst may be added incrementally or continuously over a portion of the reaction cycle. Polymerization is continued until substantially all, i.e., more than 90 percent, of the monomers have reacted. The remaining monomers and other volatile components are then distilled from the latex, which is then dewatered, washed and dried.

Particle size of the emulsion graft particles may be varied by seeding, emulsifying agent concentration, agitation, size of the particles of rubber substrate, etc. Agglomeration of particles may also be employed.

Effect of particle size and grafting ratio

It has been observed that the particle size and grafting ratio of the graft copolymers also tend to affect the properties of the compositions of the present invention. More particularly, as the particle size increases, generally there is some increase in the impact strength of the compositions while the gloss and tensile properties are reduced. Accordingly, the particle size of the graft copolymers may be varied from as little as 0.01 micron to as much as 2.0 microns and even larger, but the preferred composition utilizes graft copolymers having a particle size of 0.05 to 0.6 micron and most desirably 0.08 to 0.4 micron.

If the lowly cross-linked graft copolymer superstrate-to-substrate ratio is greater than about 50:100, there is an apparent reduction in the properties of the compositions which may be obtained. This may result from the fact that the high superstrate ratio prevents the apparent clustering of the lowly cross-linked graft copolymer particles into masses which simulate the effect of larger graft particles in terms of impact strength and while at the same time avoiding undue interference with the overall balance of properties.

Formation of the blend

The two graft copolymers may be blended in the ungrafted interpolymer matrix by various techniques. In the preferred techniques, the graft polymers are extrusion blended or mill rolled with or without the addition thereto of additional interpolymer depending upon the amount of ungrafted interpolymer in the feedstocks providing the rubber grafts and the total rubber graft content desired in the blend. Alternatively, a mixed latex of the different graft copolymers (and interpolymer as required) may be prepared and coagulated to provide crumb containing the rubber grafts of the desired two graft copolymers in the desired proportions.

Generally, the blends may contain 1.0 to 70.0 percent by weight of the two rubber grafts combined. Increasing the total amount of rubber graft while maintaining the ratio of highly cross-linked graft copolymer to total graft copolymer constant generally increases the Izod impact strength of the composition but rapidly increases the viscosity of the blend and decreases the tensile stress at yield and at fail and the tensile modulus. Accordingly, the preferred blends contain about 10.0 to 50.0 percent by weight of the combined rubber grafts, and most desirably about 15.0 to 40.0 percent by weight.

Since it is desirable to obtain a balancing of properties and variation in the amount of the lowly cross-linked graft copolymer generally has the most significant effect upon the properties at a constant total rubber content, the preferred compositions contain a high ratio of the highly cross-linked graft copolymer to lowly cross-linked copolymer. The optimum weight percentage of the highly cross-linked graft copolymer based upon total graft copolymer content is generally about 75 to 90 percent for optimum balance of properties.

Although it is possible to graft simultaneously rubber substrates having the desired distinct degrees of cross-linking, generally the problems involved in controlling the grafting efficiency to obtain the desired superstrate/substrate ratios on the two rubbers will tend to militate against such a process and in favor of separate grafting reactions. A possible route for accommodating the desired variation in graft ratios is the delayed addition of the lowly cross-linked rubber substrate to the reaction medium.

It will be readily appreciated that optional components may be added to the composition depending upon the intended use and nature thereof, such as, for example, fillers and pigments. Generally, it is necessary to incorporate stabilizers and antioxidants to prevent degradation of the graft copolymer and oftentimes of the interpolymer of the matrix. Although the stabilizers and antioxidants may be incorporated at the time of final blending, generally it is most advantageous to incorporate these components into the graft copolymers after they are formed so as to minimize any tendency for degradation or oxidation during processing and storage.

The present process permits the two graft copolymers to be prepared separately and the matrix interpolymer to also be prepared separately with the several components being storable for extended periods of time and blended only as required to form the desired composition. Thus, the rubber level or the balance of properties can be varied by selection of readily variable percentages of the several components.

If so desired, minor amounts of ungrafted rubber may be blended into the present compositions to permit some reduction in the amounts of graft copolymer required but should not exceed about 10 percent by weight of the combined graft copolymers to avoid undesirable reduction in properties.

Exemplary of the efficacy of the present invention are the following specific examples wherein all parts are parts by weight unless otherwise indicated.

EXAMPLE ONE

Part A 370 parts of a rubber latex containing 37 percent solids is added to a reactor. The rubber is a copolymer of butadiene and styrene (90:10) and has a gel content of about 75 and a swelling index of about 23. The particle size of the rubber is about 0.06 based upon number average. To the latex is added 1 part of divinylbenzene and 1 part of potassium persulfate. The rubber is cross-linked by heating the latex at a temperature of about 90° centigrade for approximately 2 hours.

To the cross-linked rubber latex is added 50 parts of a mixture of styrene and acrylonitrile monomers (70:30) over a period of 3 hours together with 0.75 part of a dodecyl mercaptan and 0.6 part of potassium persulfate and 75 parts water. The polymerization reaction is conducted at a temperature of about 70° centigrade and is held at temperature for about ½ hour following the addition of all of the monomer mixture.

Part B

A second graft latex is prepared from the uncross-linked rubber of Part A by adding to 370 parts of the latex 20 parts of a mixture of styrene and acrylonitrile monomer (70:30) over a period of approximately 1 hour together with 0.36 part of potassium persulfate and 30 parts water. The polymerization reaction is carried out at a temperature of about 60° centigrade and held at temperature for about ½ hour after completion of the addition of the monomer mixture.

Part C

Samples of the latices of Parts A and B are withdrawn and blended separately with styrene/acrylonitrile copolymer latex (80:20) to a 35 percent rubber level and these latices are separately coagulated. Thereafter the rubber crumb from the two latices is blended with the styrene/acrylonitrile copolymer (72:28) to a 26 percent rubber content and specimens are prepared therefrom.

The latex of Part A is then blended with the latex of Part B in a ratio of 70 parts to 30 parts and with a latex of styrene/acrylonitrile copolymer (80:20) to provide a latex containing 35 percent rubber. This mixed latex is then coagulated, washed and dried. The crumb is then blended with styrene/acrylonitrile copolymer (72:28) to a 26 percent rubber content and specimens are made therefrom.

Upon testing the specimens produced from the uncross-linked rubber graft, the highly cross-linked rubber graft and the mixture of the two rubber grafts are found to have the following properties:

| Specimen | Izod impact, ft. lbs./in. notch | Hunter gloss |
|---|---|---|
| Highly crosslinked rubber graft | 0.8 | 85.8 |
| Lowly crosslinked rubber graft | 7.0 | 0 |
| Mixture of lowly and highly cross-linked rubber grafts | 4.04 | 55 |

In addition, the mixture of the highly and lowly cross-linked graft copolymers is found to exhibit relatively low thermal shrinkage as compared to the lowly cross-linked component.

EXAMPLE TWO

Part A

To a reactor are added 93 parts butadiene, 7 parts acrylonitrile, 0.4 parts of dodecyl mercaptan chain transfer agent, 3.0 parts rubber reserve soap, 97 parts water, 0.3 part potassium persulfate and 0.68 part potassium chloride. The reaction mixture is heated for 16 hours at about 50° centigrade to produce a latex containing approximately 23 percent solids with a monomer conversion of about 60 percent. To the latex are added 0.4 part divinylbenzene and 0.4 part potassium persulfate. The latex is then heated for about 1 hour at 55° centigrade to effect cross-linking of the rubber. The gel content is 90.9 and the swelling index is 9.9.

To 420 parts of the latex are added 50 parts of a mixture of styrene/acrylonitrile monomer (70:30), 1.5 parts of a chain transfer agent, 1.5 parts of potassium persulfate, the monomer addition taking place over a period of approximately 5 hours. The reaction mixture is held at a temperature of about 55° centigrade during addition of the monomers and for approximately 1 hour thereafter. The conversion of monomer is approximately 94 percent.

Part B

The procedure of Part A for producing the initial rubber latex is substantially repeated with the addition of 1 part of terpinolene. Upon completion of the polymerization cycle, the latex is found to contain approximately 20.7 percent solids and to evidence 51 percent conversion of the monomers. The gel content is found to be 36 percent and the swelling index 49.3.

To this latex is added 50 parts of a mixture of styrene/acrylonitrile monomer (70:30) and 1.5 parts potassium persulfate and 1.5 parts of terpinolene. The monomer mixture is added over a period of approximately 5 hours and the temperature is maintained at about 55° centigrade during the addition of the monomer mixture and for about 1 hour thereafter to produce approximately 100 percent conversion of the monomer mixture.

Part C

The latex of Part A is blended with the latex of Part B in a 70:30 ratio and with a latex of styrene/acrylonitrile copolymer (80:20) to a 24 percent rubber level. The mixed latex is then coagulated, washed and dried and specimens are prepared from the crumb thus recovered. The Izod impact value is 5.6 foot pounds per inch notch, the Hunter Gloss value 34 and the thermal shrinkage is relatively low as compared with the lowly cross-linked graft copolymer, indicating a desirable balance of properties.

EXAMPLE THREE

There is prepared a latex of a graft copolymer utilizing a butadiene/styrene substrate (90:10) and a styrene/acrylonitrile superstrate (80:20) with a superstrate to substrate ratio of approximately 50 parts per 100 parts.

A portion of the latex is cross-linked at 95° centigrade for a period of about 3 hours by use of divinylbenzene and potassium persulfate.

Portions of the cross-linked and relatively lowly cross-linked graft copolymer latices are each blended with styrene/acrylonitrile copolymer latex (80:20) to a 35 percent rubber level and are coagulated. The rubber crumb recovered from the coagulation process is then blended with styrene/acrylonitrile copolymer (72:28) to a 16 percent rubber level. Specimens produced from the relatively lowly cross-linked graft copolymer are found to have an Izod impact value of 5.9 foot pounds per inch notch, a Hunter Gloss of 12 and a percent shrinkage value of 36. Specimens produced from the highly cross-linked graft copolymer are found to have an Izod impact value of only 0.56 foot pounds per inch notch, a Hunter Gloss value of 69.9 and a percent shrinkage value of 27.4.

What is claimed is:

1. A composition comprising a polyblend consisting essentially of: (A) a matrix of a resinous interpolymer consisting at least principally of a monovinylidene aromatic hydrocarbon and an ethylenically unsaturated nitrile; (B) a first graft copolymer having a rubber substrate containing a diene monomer component and a superstrate of an interpolymer consisting at least principally of a monovinylidene aromatic hydrocarbon and an ethylenically unsaturated nitrile, said first graft copolymer being highly cross-linked with the rubber substrate having a swelling index of less than 10 and a gel content of at least 90 percent; and (C) a second graft copolymer having a rubber substrate containing a diene monomer component and a superstrate of an interpolymer consisting at least principally of a monovinylidene aromatic hydrocarbon and an ethylenically unsaturated nitrile, said second graft copolymer being relatively lowly cross-linked with the rubber substrate having a swelling index of not less than 20 and a gel content of not more than 70 percent, the superstrate to substrate ratio being not greater than 50:100, the total of said first and second graft copolymers comprising 1.0 to 70.0 percent by weight of said polyblend and said first graft copolymer comprising about 60.0 to 95.0 percent by weight of the total weight of the graft copolymers combined, said graft copolymers having a particle size of 0.05 to 0.6 micron.

2. The composition of claim 1 wherein said monovinylidene aromatic hydrocarbon of said interpolymers of the matrix and graft copolymer superstrates is styrene.

3. The composition of Claim 1 wherein said unsaturated nitrile of said interpolymers of the matrix and graft copolymer superstrates is acrylonitrile.

4. The composition of claim 1 wherein the rubber substrate of said graft copolymers contains at least about 75 percent by weight of conjugated 1,3-diene.

5. The composition of claim 1 wherein said monovinylidene aromatic hydrocarbon and unsaturated nitrile comprise at least 75.0 percent by weight of the interpolymers of the graft copolymer superstrates and matrix.

6. The composition of claim 1 wherein said graft copolymers comprise about 10.0 to 50.0 percent by weight of said polyblend.

7. The composition of claim 1 wherein said first graft copolymer has a superstrate to substrate ratio of about 30.0 to 200.0:100 and wherein said second graft copolymer has a superstrate to substrate ratio of about 10.0 to 50:100.

8. The composition of claim 1 wherein said graft copolymers have an average particle size, based on number average, of about 0.08 to 0.4 micron.

9. A composition comprising a polyblend consisting essentially of: (A) a matrix of a resinous interpolymer consisting at least principally of a monovinylidene aromatic hydrocarbon and an ethylenically unsaturated nitrile; (B) a first graft copolymer having a rubber substrate containing a diene monomer component and a superstrate of an interpolymer consisting at least principally of a monovinylidene aromatic hydrocarbon and an ethylenically unsaturated nitrile, said first graft copolymer having a superstrate to substrate ratio of 30 to 200:100 and being highly cross-linked with the rubber substrate having a swelling index of less than 10.0 and a gel content of at least 90 percent; and (C) a second graft copolymer having a rubber substrate and a superstrate of an interpolymer consisting at least principally of a monovinylidene aromatic hydrocarbon and an ethylenically unsaturated nitrile, said second graft copolymer having a superstrate to substrate ratio of 10 to 50:100 and being lowly cross-linked with the rubber substrate having a swelling index of at least 30 and a gel content of not more than 70 percent, the total of said first and second graft copolymers comprising 10 to 50 percent by weight of said polyblend and said first graft copolymer comprising about 75.0 to 95.0 percent by weight of the total weight of the graft copolymers combined, said graft copolymers having a particle size of 0.05 to 0.6 micron.

10. The composition of claim 9 wherein said monovinylidene aromatic hydrocarbon of said interpolymers to the matrix and graft copolymer superstrates is styrene.

11. The composition of claim 9 wherein said unsaturated nitrile of said interpolymers of the matrix and graft copolymer superstrates is acrylonitrile.

12. The composition of claim 9 wherein the rubber substrate of said graft copolymers contains at least about 75 percent by weight of conjugated 1,3-diene.

13. The composition of claim 9 wherein said monovinylidene aromatic hydrocarbon and unsaturated nitrile comprise at least 75.0 percent by weight of the interpolymers of the graft copolymer superstrates and matrix.

14. The composition of claim 9 wherein said monovinylidene aromatic hydrocarbon of said interpolymers of the matrix and graft copolymer superstrates is styrene and wherein said unsaturated nitrile of said interpolymers is acrylonitrile and wherein said styrene and acrylonitrile comprise at least 75.0 percent by weight of the interpolymers of said graft copolymer superstrates and matrix.

15. In the process for preparing a polyblend, the steps comprising: (A) polymerizing a first polymerizable mixture containing a monomer formulation and a prepolymerized rubber having a diene monomer component to graft at least a portion of the polymerizing monomers upon said rubber and to provide a first graft copolymer, said monomer formulation consisting at least principally of a monovinylidene aromatic hydrocarbon and an ethylenically unsaturated nitrile, said rubber having a swelling index of less than 10 and a gel content of more than 90; (B) polymerizing a second polymerizable mixture containing a monomer formulation and a prepolymerized rubber having a diene monomer component to graft at least a portion of the polymerizing monomers upon said rubber and to provide a second graft copolymer having a superstrate to substrate ration being not greater than 50:100, said monomer formulation consisting at least principally of a monovinylidene aromatic hydrocarbon and an ethylenically unsaturated nitrile, said rubber having a swelling index of not less than 20 and a gel content of not more than 70; and (C) blending said first and second graft copolymers to provide a polyblend wherein said graft copolymers comprise a total of 1.0 to 70.0 percent by weight thereof and wherein said first graft copolymer comprises about 60.0 to 95.0 percent by weight of the total weight of the graft copolymers combined, said graft copolymers having a particle size of 0.05 to 0.6 micron.

16. The process of claim 15 wherein said monovinylidene aromatic hydrocarbon of said monomer formulations is styrene.

17. The process of claim 15 wherein said unsaturated nitrile of said monomer formulations is acrylonitrile.

18. The process of claim 15 wherein the rubber of said first and second mixtures contains at least about 75.0 percent of conjugated 1,3-diene.

19. The process of claim 15 wherein said monovinylidene aromatic hydrocarbon and unsaturated nitrile comprise at least 75.0 percent by weight of the monomer formulations of said first and second mixtures.

20. The process of claim 15 wherein said first graft copolymer has a superstrate to substrate ratio of about 30.0 to 200.0:100 and wherein said second graft copolymer has a superstrate to substrate ratio of about 10.0 to 50.0:100.

21. The process of claim 15 wherein the rubber of said first graft copolymer has a swelling index of less than 10 and a gel content of at least 95 and wherein the rubber of said second graft copolymer has a swelling index of at least 30 and a gel content of not more than 60, and wherein said graft copolymers are admixed so to provide said first graft copolymer in about 75.0 to 95.0 percent by weight of the graft copolymers combined.

22. The process of claim 15 wherein the polymerizable mixture of said polymerizing steps is an emulsion of the prepolymerized rubber and monomer formulation.

References Cited

UNITED STATES PATENTS

| | | | |
|---|---|---|---|
| 3,345,434 | 10/1967 | Griffith et al. | 260—876 |
| 3,073,798 | 1/1963 | Baer | 260—876 |

FOREIGN PATENTS

| | | | |
|---|---|---|---|
| 740,188 | 11/1955 | Great Britain | 260—892 |
| 673,030 | 3/1966 | Belgium | 260—876 |

MURRAY TILLMAN, Primary Examiner

C. J. SECCURO, Assistant Examiner

U.S. Cl. X.R.

260—880